US006643416B1

(12) United States Patent
Daniels et al.

(10) Patent No.: US 6,643,416 B1
(45) Date of Patent: Nov. 4, 2003

(54) METHOD FOR DETERMINING NECESSARY RESOLUTION FOR ZOOM AND CROP IMAGES

(75) Inventors: Cathleen M. Daniels, Rochester, NY (US); Raymond W. Ptucha, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/451,072

(22) Filed: Nov. 30, 1999

(51) Int. Cl.[7] .......................... G06K 9/32; H04N 1/387; H04N 5/222; G06T 17/00
(52) U.S. Cl. ...................... 382/299; 382/298; 382/295; 382/255; 382/260; 358/452; 358/451; 358/1.2; 345/698; 345/428; 348/333.12; 348/208.13
(58) Field of Search ................................ 382/255, 260, 382/263, 274, 275, 293, 295, 298, 299, 209, 217, 218, 219, 216, 262, 264, 265, 266, 278, 303, 305, 307; 345/660, 661, 671, 672, 698, 699, 428; 358/1.2, 3.07, 451, 452; 348/208.13, 273, 333.11, 333.12

(56) References Cited

U.S. PATENT DOCUMENTS

| | | | |
|---|---|---|---|
| 5,218,455 A | 6/1993 | Kristy .......................... 358/403 |
| 5,295,204 A * | 3/1994 | Parulski ...................... 382/284 |
| 5,301,244 A * | 4/1994 | Parulski ...................... 382/314 |
| 5,404,433 A | 4/1995 | Hosogai ...................... 395/144 |
| 5,446,492 A | 8/1995 | Wolf et al. .................. 348/192 |
| 5,576,811 A | 11/1996 | Kobayashi et al. ......... 355/246 |
| 5,600,574 A | 2/1997 | Reitan ......................... 364/552 |
| 5,692,065 A | 11/1997 | Prakash et al. ............. 382/112 |
| 5,694,484 A | 12/1997 | Cottrell et al. ............. 382/167 |
| 5,739,924 A | 4/1998 | Sano ........................... 358/487 |
| 5,745,255 A | 4/1998 | Yamaguchi ................. 358/426 |
| 5,764,235 A | 6/1998 | Hunt et al. .................. 345/428 |
| 6,067,112 A * | 5/2000 | Wellner et al. ............. 348/211 |
| 6,147,709 A * | 11/2000 | Martin et al. ............... 348/239 |
| 6,339,483 B1 * | 1/2002 | Hoshino et al. ............ 358/487 |

OTHER PUBLICATIONS

"Cubic Convolution Interpolation for Digital image Processing" by Robert G. Keys. IEEE Transactions on Acoustics, Speech, and Signal Processing, vol. ASSP–29, No. 6, Dec. 1981.
"Subjective Image Quality as a Function of Viewing Distance, Resolution, and Picture Size" by Joyce H.D.M. Westerink and Jacques A.J. Roufs. SMPTE Journal, Feb. 1989.
"A Local Basis for Perceptually Relevant Resolution Measures" by Joyce H.D.M. Westerink and Jacques A.J. Roufs, SID 88 Digest. 1988.
A Model for Predicting the Just–Noticeable Difference in Image Structure as a Function of Display Modulation Transfer by Curtis R. Carlson and Roger W. Cohen. SID 78 Digest.
"Perceptual error measure for sampled and interpolated imagery" by M.R.M. Nijenhuis, F.J.J. Blommaert. Institute for Perception Research, Einkhoven, The Netherlands.
"An Improved Objective Method for Rating Picture Sharpness: CMT Acutance" by R.G. Grendon. SMPTE Journal, v. 82, pp. 1009–1012 (1973).

* cited by examiner

Primary Examiner—Bhavesh M. Mehta
Assistant Examiner—Yosef Kassa
(74) Attorney, Agent, or Firm—David M. Woods

(57) ABSTRACT

The disclosed method uses empirically derived image quality data in order to determine an image resolution for a particular zoom and/or crop operation performed on an image. An acceptability value is specified for the image, e.g., a specific % acceptable, where the acceptability value relates to empirically derived image quality as perceived by a human viewer. Given selected input and output devices, an image resolution is then generated from a combination of the particular zoom and crop and the specified acceptability value. This resolution is specified as the image resolution, e.g., a minimally acceptable resolution, to produce the desired zoom and crop.

30 Claims, 6 Drawing Sheets

METHOD FOR DETERMINING NECESSARY RESOLUTION FOR ZOOM AND CROP IMAGES

FIELD OF THE INVENTION

This invention relates to image reproduction, and in particular to reproduction methods and apparatus based on input scanning.

BACKGROUND OF THE INVENTION

In the field of image reproduction, methods and apparatus are used to produce images which can be acquired from a variety of digital input devices (e.g., various types of digital cameras and scanners) and displayed on a variety of output devices (e.g., various types of hardcopy and softcopy output devices). The necessary input device resolution is determined based upon the input device modulation transfer function (MTF), the output device MTF, the user's desired amount of zoom/crop, the display medium, and perceived image quality and acceptability.

Recently, there has been great interest in the optimal scan resolution for digital imaging systems. Previous research suggests that image resolution affects perceived image quality (J. H. D. M. Westerink and J. A. J. Roufs, "A Local Basis for Perceptually Relevant Resolution Measures", *SID 88 Digest*, pp. 360–363, (1988), and J. H. D. M. Westerink and J. A. J. Roufs, "Subjective Image Quality as a Function of Viewing Distance, Resolution, and Picture Size", *SMPTE Journal*, pp. 113–119, February 1989). However, these studies do not provide data for many other important variables that may alter perceived image quality due to resolution, particularly zoom/crop amount, for various film scanner resolutions.

Currently, the scan resolution for imaging systems has been based on methods that evaluate the system processing speed, size of the image buffer, and the developer's judgment of image quality. These methods do not take into account the typical user's perception of image quality. In designing a system that provides the best trade-off between image quality and system processing speed and the size of the image buffer, it would be desirable to determine an optimal resolution. However, the methods described to date do not determine the necessary resolution for the specification of an imaging system as a function of empirically derived image quality data and system requirements. Consequently, a user requesting a desired zoom/crop amount from an imaging system, e.g., a database of images accessible over the internet, may obtain degraded image quality due to insufficient scan resolution.

Consequently, besides providing specifications for film digitization systems, knowledge of a minimally necessary scan resolution could provide the basis for warning a user when there is inadequate scan resolution for a desired zoom/crop amount at a particular image quality level.

SUMMARY OF THE INVENTION

It is an object of the invention to determine the necessary scan resolution for users to zoom and crop images by various amounts.

It is a further object of the invention to determine the necessary resolution for the specification of an imaging system as a function of empirically derived image quality data and system requirements.

It is a further object of the invention to provide a warning to a user when there is inadequate scan resolution for a desired zoom/crop amount and image quality level.

The present invention is directed to overcoming one or more of the problems set forth above. Briefly summarized, according to one aspect of the present invention, the invention uses empirically derived image quality data in order to determine an image resolution for a particular zoom and/or crop operation performed on an image. An acceptability value is specified for the image, e.g., a specific % acceptable, where the acceptability value relates to empirically derived image quality as perceived by a human viewer. Given a selected output medium, an image resolution is then generated from a combination of the particular zoom and crop, the specified acceptability value and the selected output medium. This resolution is specified as the image resolution, e.g., a minimally acceptable resolution, to produce the desired zoom and crop.

Approached from a different aspect, the invention also resides in a method for warning a user of inadequate scan resolution to zoom and/or crop an image at an acceptable image quality. The user indicates a desire to perform a given zoom and crop operation on the image for a preferred display medium. A minimally acceptable scan resolution for the desired amount of zoom and crop is generated by relating the specified acceptability value to the desired zoom and crop and the preferred display medium. This determines the resolution of the digital image necessary to produce the desired zoom and crop. If the desired zoom and crop will be provided at less than the minimally acceptable scan resolution, then a warning will be provided to the user.

From yet another aspect, the invention resides in determining the acceptability of an image by starting with an objective metric related to sharpness, such as image acutance. The invention, from this aspect, involves relating a particular zoom and crop imaging operation to the objective sharpness metric and then relating the objective sharpness metric to a subjective acceptability metric that is based upon evaluation of particular images modified by application of the particular imaging operation. The acceptability metric is then compared to an acceptability threshold to determine the acceptability of an image that is selected for the particular imaging operation.

The advantage of the method described above resides in its novel means for using empirically derived image quality data to provide a warning to the user of degraded image quality due to insufficient scan resolution. Moreover, the invention can be reduced to an algorithm to determine the necessary scan resolution depending on the user's desired amount of zoom and crop, the display medium and size, and perceived image quality. This algorithm could be used to warn the user of degraded image quality due to insufficient scan resolution or it could be used as a method for system design.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts.

Still further, as used herein, the computer program may be stored in computer readable storage medium, which may comprise, for example; magnetic storage media such as a magnetic disk (e.g., a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
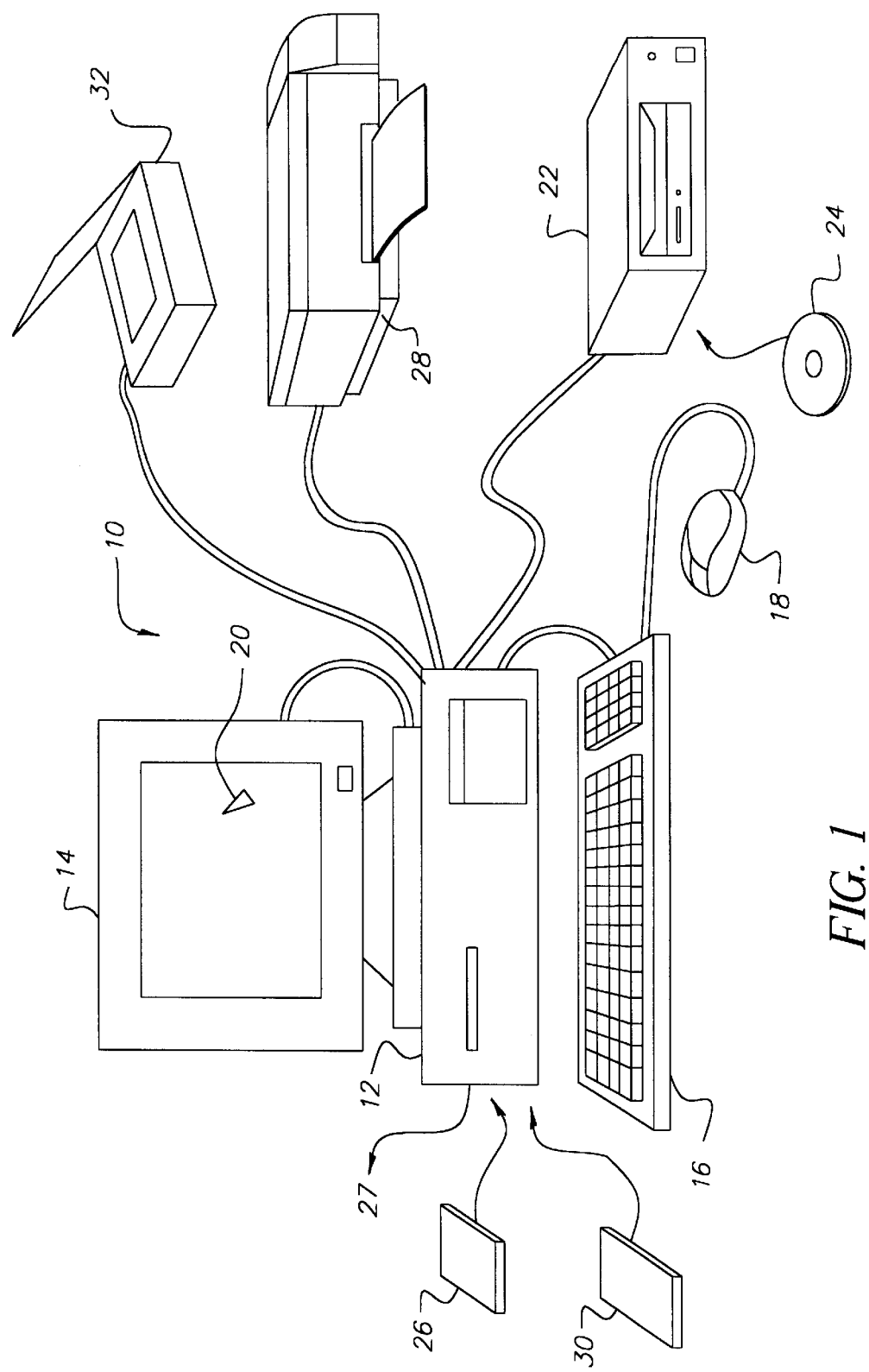
FIG. 1 is a is a perspective diagram of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 12 for receiving and processing software programs and for performing other processing functions. A display 14 is electrically connected to the microprocessor-based unit 12 for displaying user-related information associated with the software, e.g., a graphical user interface would provide images cropped and/or zoomed in accordance with the invention to maintain an acceptable image quality level. A keyboard 16 is also connected to the microprocessor based unit 12 for permitting a user to input information to the software. As an alternative to using the keyboard 16 for input, a mouse 18 may be used for moving a selector 20 on the display 14 and for selecting an item on which the selector 20 overlays, as is well known in the art.

A compact disk-read only memory (CD-ROM) 22 is connected to the microprocessor based unit 12 for receiving software programs and for providing a means of inputting the software programs and other information to the microprocessor based unit 12 via a compact disk 24. Such software programs could include a software program for determining a necessary resolution for zooming and cropping images in accordance with the invention, or for warning a user if a desired zoom and crop will result in inadequate quality. In addition, or alternatively, a floppy disk 26 may also include the software program; the floppy disk 26 is inserted into the microprocessor-based unit 12 for inputting the software program. Still further, the microprocessor-based unit 12 may be programmed, as is well known in the art, for storing the software program internally. The microprocessor-based unit 12 may also have a network connection 27, such as a telephone line, to an external network, such as a local area network or the Internet. In that case, the software program could be resident on a network server and then accessed as needed, or it could be downloaded to the computer system 10. A printer 28 is connected to the microprocessor-based unit 12 for printing a hardcopy of the output of the computer system 10.

Images may also be displayed as softcopy on the display 14 via a personal computer card (PC card) 30, such as, as it was formerly known, a PCMCIA card (based on the specifications of the Personal Computer Memory Card International Association) which contains digitized images electronically embodied in the card 30. The PC card 30 is ultimately inserted into the microprocessor based unit 12 for permitting visual display of the image on the display 14. Images may also be input via the compact disk 24, the floppy disk 26, or the network connection 27. Any images stored in the PC card 30, the floppy disk 26 or the compact disk 24, or input through the network connection 27, may have been obtained from a variety of sources, such as a digital camera (not shown). Images may also be provided by a scanner 32 connected to the computer system 10, which may provide for scanning of an image at one or several levels of scan resolution as described in connection with the invention. Such scanning may also occur remotely and the results be transmitted to the computer system 10 via the network connection 27 or any of the mentioned storage devices.

Inasmuch as the objective of this invention is to determine the necessary scan resolution to zoom and crop images by various amounts while maintaining an acceptable quality level, a study was conducted to determine perceived image quality for various scan resolutions. The study image parameters followed a factorial design that included a series of simulated scan resolutions, zoom/crop amounts and print sizes. Observers rated perceived image quality and categorized all of the images as "acceptable" or "unacceptable". An objective metric (acutance) based on system modulation transfer functions (MTFs) and the parameters outlined above was calculated. Consequently, the relationship between image quality, acceptability and acutance can be calculated.

Further details of the study are described in Appendix 1, which sets forth the design of the experiment for determining perceived image quality, and in C. M. Daniels, R. W. Ptucha and L. Schaefer, "The Necessary Resolution to Zoom and Crop Hardcopy Images," *Proceedings of IS & T's PICS Conference*, Savannah, Ga., April 1999. The levels of the relevant study variables, which are useful for interpreting the subsequent tables, are as follows:

Scan resolution—Softcopy: base/16 (128×192), base/4 (256×384) and base (512×768); hardcopy: base (512×768), 4 base (1024×1536) and 16 base (2048×3072).

Zoom/crop amount—softcopy: 1X, 1.5X, 2X, 4X and 6X; hardcopy 4"×6": 1X, 1.5X, 2X, 4X and 6X; hardcopy 8"×12": 1X, 2X and 6X. Zoom/crop amounts were calculated from the original scanned image.

Image size—softcopy: constant at 4"×6": (base/4 (256× 384)) at 64 dpi; hardcopy 4"×6" (16 base (2048×3072)); hardcopy 8"×12" (64 base (4096×6144)) at 508 dpi.

As a result of the study, the minimum acceptable scan resolutions were found for each of several acceptability levels (i.e., 100%, 90%, and 50% acceptability levels) and several zoom/crop amounts (1X, 1.5X, 2X, 4X or 6X) for both softcopy and hardcopy output types. Softcopy resolutions were found both for softcopy preview situations, i.e., the resolution minimally necessary for evaluating and judging an image, and for softcopy use situations, i.e., the resolution minimally necessary for sharing and enjoying images. Hardcopy resolutions were found for 4"×6" and 8"×12" output types.

This data is presented in Tables 1–4, which shows the minimally acceptable scan resolution that was determined for a given zoom/crop amount for various acceptability levels. While the results of the studies may be used with many known interpolation techniques, a preferred method of interpolation is cubic convolution, as described in R. G. Keys, "Cubic Convolution Interpolation for Digital Image Processing", *IEEE Trans. On Acoustics, Speech, and Signal Processing*, ASSP-29, No. 6, pp. 1153–1160, December 1981. In some instances, the minimum scan resolution falls between two scan resolutions manipulated in the study; these cases are indicated by citing the two scan resolutions. There were also cases where a higher (or lower) scan resolution than used in the study should be recommended; these cases are indicated with a "+" (or "−") symbol. "Quality" is the mean image quality rating discussed in connection with FIGS. 3–5.

TABLE 1

Softcopy preview minimum acceptable scan resolutions for zoom/crop amounts.
Zoom/Crop Amount/Softcopy Preview

| Acceptability | Quality | 1X | 1.5X | 2X | 4X | 6X |
|---|---|---|---|---|---|---|
| 100% | 170 | Base+ | Base+ | Base+ | Base+ | Base+ |
| 90% | 115 | Base/4 | Base | Base | Base+ | Base+ |
| 50% | 78 | Base/16 | Base/4 Base/16 | Base/4 | Base+ | Base+ |

TABLE 2

Softcopy use minimum acceptable scan resolutions for zoom/crop amounts.
Zoom/Crop Amounts/Softcopy Use

| Acceptability | Quality | 1X | 1.5X | 2X | 4X | 6X |
|---|---|---|---|---|---|---|
| 100% | 140 | Base+ | Base+ | Base+ | Base+ | Base+ |
| 90% | 102 | Base/4 | Base | Base | Base+ | Base+ |
| 50% | 75 | Base/16 | Base/4 Base/16 | Base/4 Base/16 | Base+ Base/4 | Base+ |

TABLE 3

Hardcopy 4" × 6" minimum acceptable scan resolutions for zoom/crop amounts.
Zoom/Crop Amount

| Acceptability | Quality | 1X | 1.5X | 2X | 4X | 6X |
|---|---|---|---|---|---|---|
| 100% | 120 | 16Base+ | 16Base+ | 16Base+ | 16Base+ | 16Base+ |
| 90% | 87 | Base | 4Base Base | 4Base | 16Base | 16Base+ |
| 50% | 65 | Base− | Base− | Base− | 4Base Base | 16Base 4Base |

TABLE 4

Hardcopy 8" × 12" minimum acceptable scan resolutions for zoom/crop amounts.
Zoom/Crop Amount

| Acceptability | Quality | 1X | 2X | 6X |
|---|---|---|---|---|
| 100% | 120 | 16Base+ | 16Base+ | 16Base+ |
| 90% | 90 | 4Base Base | 16Base+ | 16Base+ |
| 50% | 70 | Base− | 4Base Base | 16Base+ |

As a general conclusion, assuming that most consumers wish to zoom/crop a significant proportion of their pictures by 2.0X and that at least 90% of consumers should rate the image as acceptable, a Base image is required for softcopy preview and use, a 4 Base image is required for creating 4"×6" prints and an image file in excess of 16 Base is required for creating 8"×12" enlargements given traditional photo creation methods. To generalize this result for other zoom/crop amounts and acceptability levels and hardcopy/softcopy sizes, equations are fitted to the values in the tables using conventional mathematical techniques, e.g., as described in *Applied Linear Statistical Models*, by J. Neter, W. Wasserman, M. H. Kutner, $2^{nd}$ ed., 1985, R. D. Irwin Inc., Illinois.

The equations thus referenced to the above tables may be embodied in a simple algorithm, which basically chooses the appropriate equation for the occasion, that is, for the particular output medium selected. This algorithm can be used to select appropriate input resolution and to warn users of inferior image quality. In an algorithm of this type, the resultant image quality Y is a function of input MTF, magnification and output MTF, as follows:

$$Y_{1\ldots n} = f_{1\ldots n} \text{ (input MTF, magnification, output MTF)}$$

where n=the particular equation fitted to a particular output medium chosen by the user, i.e., softcopy preview or softcopy use or hardcopy of a chosen size, and where magnification is a function of output and input resolution, and zoom/crop amount, as follows:

$$mag = \frac{output\ resolution}{input\ resolution} \times zoom/crop\ amount$$

The algorithm is basically a decision tree for accessing the correct equation for the occasion, on the order of the following model:

if (softcopy preview)
        $Y=f_1$
    if (softcopy use)
        $Y=f_2$
    if (hardcopy)
        $Y_{4\times 6}=f_3$
        $Y_{8\times 12}=f_4$ The equations $f_1$–$f_4$ referenced by the algorithm can then be inverted to calculate the necessary input resolution for a given zoom/crop amount and output resolution for both softcopy and hardcopy display devices. While this algorithm is illustrated for specific output situations, it should be clear that the equations may be generalized for other situations, e.g., other hardcopy/softcopy sizes, and thus the algorithm may be likewise generalized.

Figure 2:
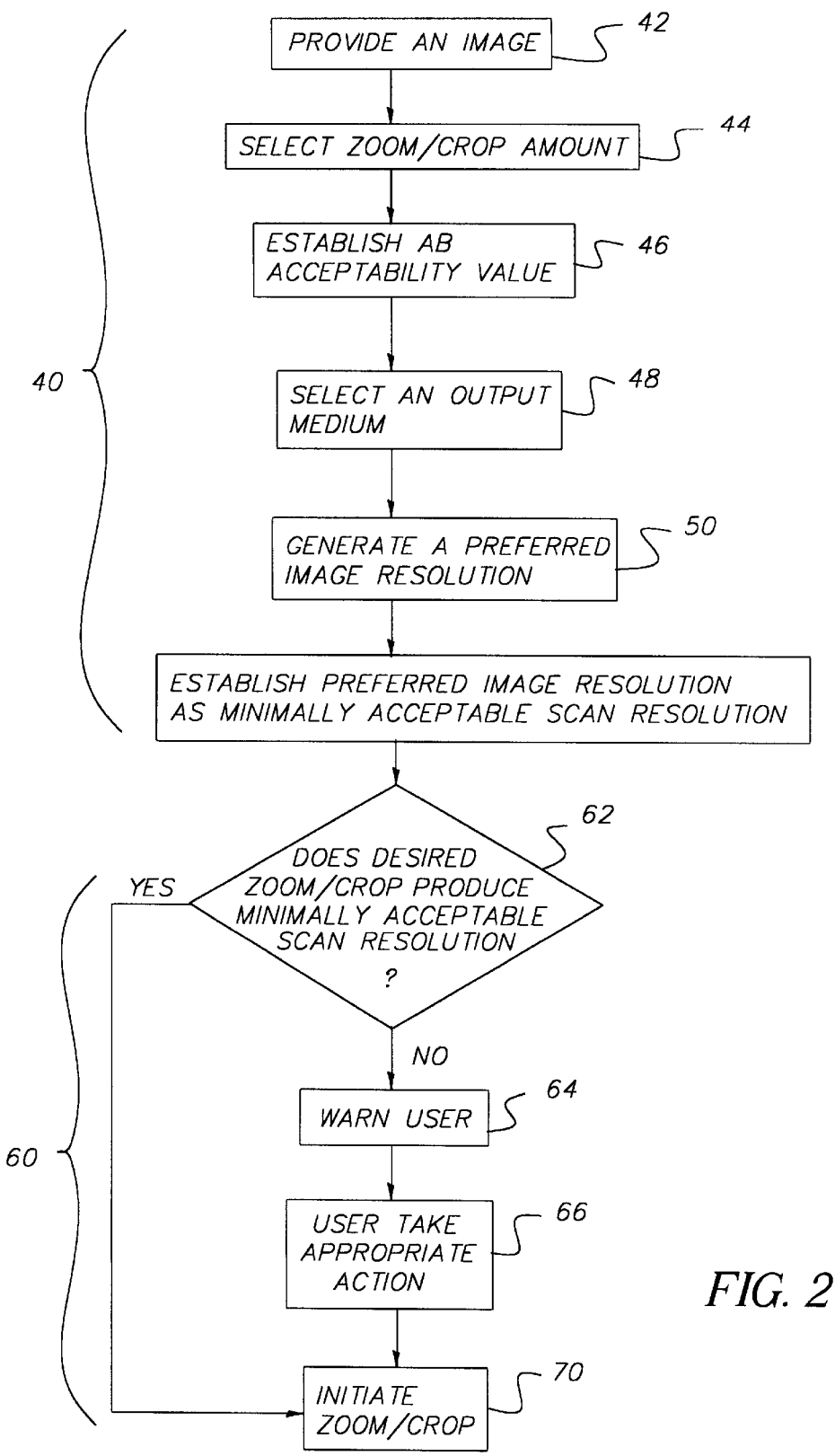
FIG. 2 is a flow diagram of the steps involved in establishing an image resolution for a given zoom/crop operation, and in producing a warning signal if the desired zoom/crop fails to exceed a minimally acceptable scan resolution.

The application of this data may be embodied in a procedure, as expressed in the flow chart in FIG. 2, for determining a minimally acceptable scan resolution. A first stage 40 generates an image resolution (which may be a minimally acceptable scan resolution) and a second stage 60 provides a warning if a particular zoom/crop operation fails to provide the minimally acceptable scan resolution. In the first stage 40, an image is provided in a step 42 and a particular amount of zoom and/or crop is selected in a zoom/crop selection step 44. Next, an acceptability value, e.g., 100%, 90%, 50%, etc., is established in the acceptability step 46, wherein the acceptability value relates to empirically derived image quality as perceived by a human viewer. The output medium, including for example the type and size of the medium as appropriate, is specified in an output specification step 48. The selected zoom and/or crop, acceptability value and output medium are related to scan resolution to specify an image resolution in the resolution generation step 50. This is the resolution needed to produce the desired zoom and/or crop.

If a warning is to be produced, then the image resolution is treated as the minimally acceptable scan resolution for the desired zoom/crop, given the output medium and the required acceptability value. Therefore, in a resolution evaluation step 62 in the second stage 60, the desired zoom/crop is evaluated to determine if it will produce a minimally acceptable scan resolution. If the answer is "yes", the desired zoom/crop is initiated in a scan step 70. If the desired zoom/crop will not produce a minimally acceptable scan resolution, then a warning is provided to the user in a warning step 64. This warning will take many different forms depending on the situation. For instance, if the application program is connected to the scanner 32 (see FIG. 1), it may perform the requested zoom/crop but also indicate that a better result may be obtained at a higher scan resolution. Then the scanner could be reset to the higher resolution. If the image is being downloaded off the Internet over the network connection 27, the user may be warned that he/she will be unhappy with (hardcopy) output because the requested zoom/crop will fail to provide minimally acceptable resolution for acceptable results with that output medium. An appropriate zoom/crop amount could then be suggested. These are just a few examples of the warning; other types will come to mind and are intended to be included within the scope of this patent. The typical outcome of the warning is that the user will take appropriate action in an action step 66, such as to modify the zoom/crop requirement or to increase the scan resolution, if that option is available, or to modify the output medium, such as by changing the size requirement for hardcopy output. After suitable modification, the zoom/crop is initiated in the step 70.

Figure 3:
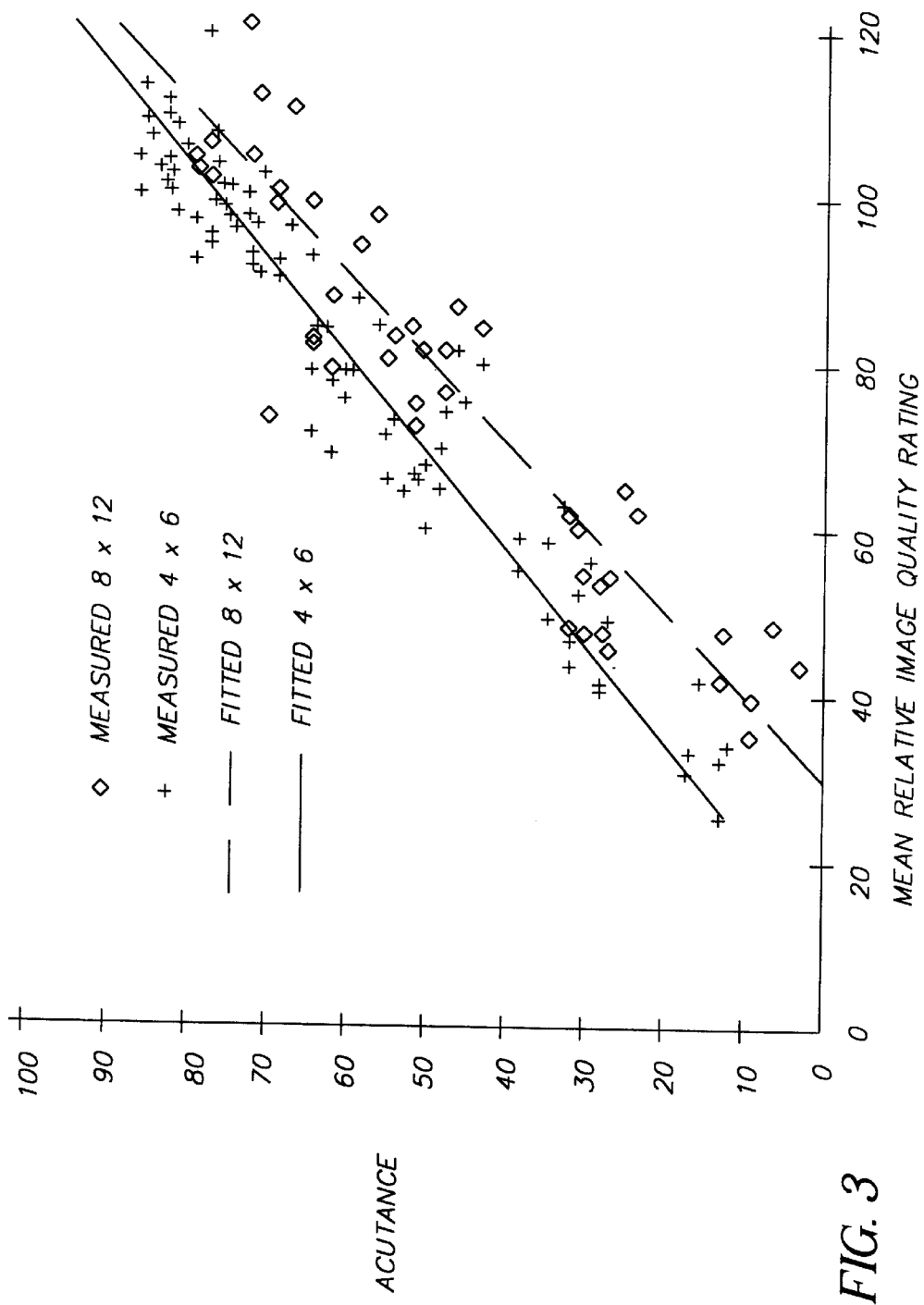
FIG. 3 is a plot of acutance as a function of mean relative image quality ratings for 4"×6" and 8"×12" prints.

Referring now to FIG. 3, the invention can be seen from another aspect, where an acutance value is plotted for values of mean image quality rating for hard copy images (acutance being a well-understood concept as described in R. G. Grendon, "An Improved Objective Method for Rating Picture Sharpness: CMT Acutance", *J. SMPTE*, v. 82, pp. 1009–1012 (1973)). The acutance value is calculated from a printer modulation transfer function (MTF), a viewing distance, a magnification amount, an interpolation method (e.g., cubic convolution or linear), and the human contrast sensitivity function. These values are cascaded in a known manner to calculate a one-number value, that is, acutance, that describes the overall sharpness of an image as perceived by a human observer. To further elucidate these relationships, customer perceived quality at a given acutance was calculated and linear regression was used to obtain fitted values. For both 4"×6" and 8"×12" prints, the image quality ratings are shown in FIG. 3.

The image quality ratings should be examined in concert with acceptability categories. To this end, the frequency percent for each rating was calculated for 4"×6" (FIG. 4) and 8"×12" prints (FIG. 5). Logistic regression was used to fit a curve to the measured data (e.g., see *The Analysis of Cross-Classified Categorical Data*, R. Fienberg, $2^{nd}$ ed, 1980, MIT Press: Massachusetts). These regression equations then can be used to predict the relationship between mean image quality rating and frequency percent for acceptability.

Figure 6:
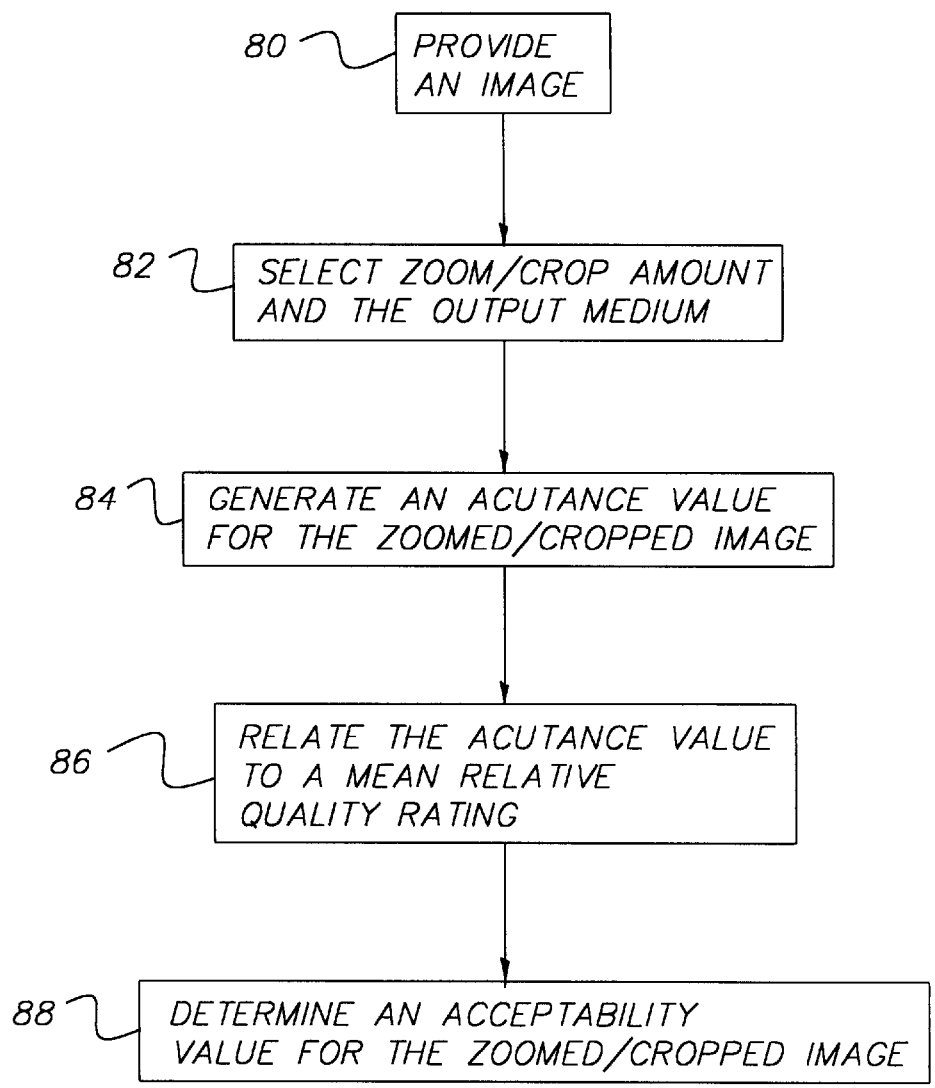
FIG. 6 is a flow diagram of the steps involved in generating an acceptability level from the information shown in FIGS. 3, 4 and 5.

All three metrics, that is, acutance, mean relative image quality and frequency per cent of acceptable images, can be combined to recommend a minimally acceptable scan resolution at a given zoom/crop amount. For each acceptability level, a mean quality rating and requisite acutance value can be calculated from the relationships obtained previously. Then, for any system calculated acutance, we can predict the acceptability of a print from that system. The steps are shown in the flow diagram of FIG. 6. After an image is provided and a zoom/crop amount and an output medium (device) is specified (steps 80 and 82), an acutance value for the amount of zoom and/or crop is determined in an acutance generation step 84. The acutance value is then related to a mean relative image quality rating in the relational step 86. An acceptability level is then predicted from the mean relative image quality rating in the prediction step 88. This result is quite powerful in that these acceptability levels can hold for any sharpness producing imaging system.

Figure 4:
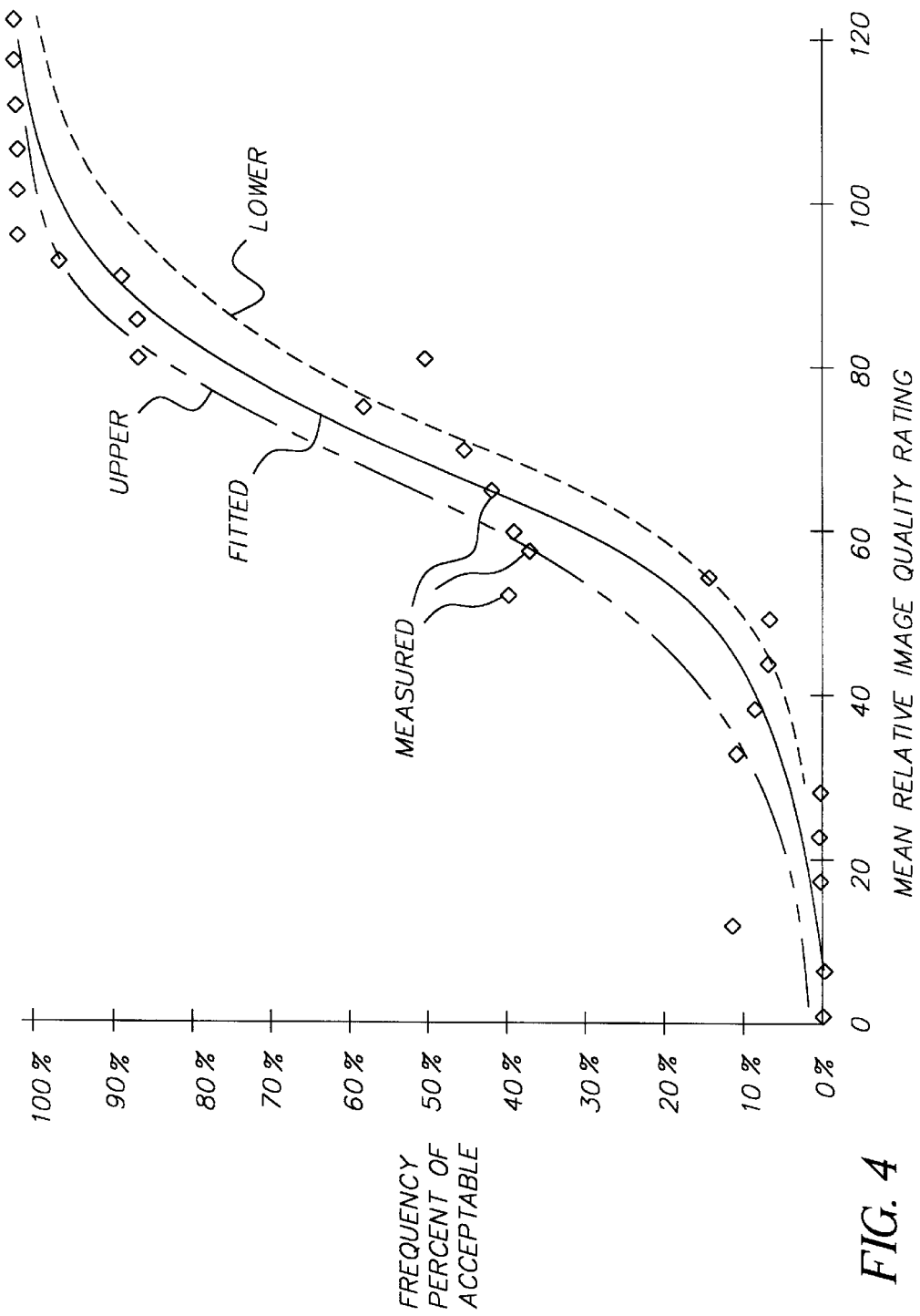
FIG. 4 is a plot of acceptability for 4"×6" prints as a function of mean relative image quality rating.
Figure 5:
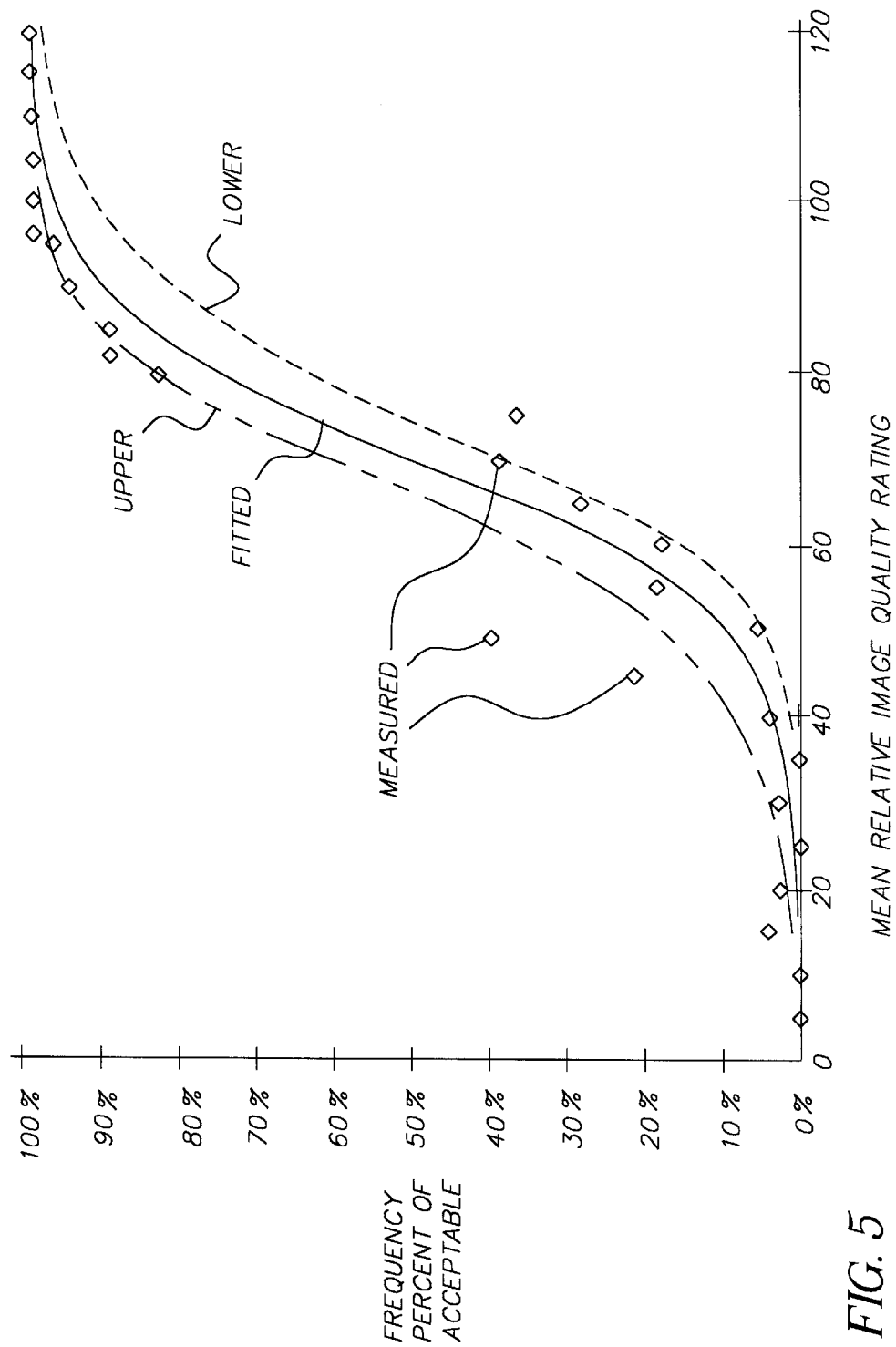
FIG. 5 is a plot of acceptability for 8"×12" prints as a function of mean relative image quality rating.

Given a predetermined per cent acceptability, the corresponding mean relative image quality rating is determined using FIGS. 4 or 5, and then the corresponding acutance is determined using FIG. 3. Then, as described in connection with FIG. 2, the zoom/crop amount or the scanner resolution can be modified such that the aim acutance is obtained. Therefore, a scanner resolution for a system can be chosen based on the intended user needs for zoom/crop and acceptability. In addition, when a user is zooming and cropping images with a digital system, they can be warned if they choose a zoom and crop amount that will result in an image with predicted unacceptable quality.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | computer system |
| 12 | microprocessor-based unit |
| 14 | display |
| 16 | keyboard |
| 18 | mouse |
| 20 | selector |
| 22 | CD-ROM |
| 24 | CD |
| 26 | floppy disk |
| 27 | network connection |
| 28 | printer |
| 30 | PC card |
| 32 | scanner |
| 40 | first stage |
| 42–50 | steps |
| 60 | second stage |
| 62–70 | steps |
| 80–90 | steps |

APPENDIX I

PERCEIVED IMAGE QUALITY EXPERIMENTS

Observers

Nineteen persons who met the criteria for a "typical consumer" participated in this study. Observers who judge images as part of their job, or work on related products, were excluded form the study. They all had normal or corrected-to-normal visual acuity (20/30) as well as normal color vision.

Experimental Design

To determine relative perceived image quality, a series of images were compared by human observers to a reference image. These images were generated by the parameters in fully within-subjects factorial designs. The levels of the variables were slightly different for 4" × 6" and 8" × 12" print sizes and softcopy. The levels of the study variables were as follows:

Scan resolution - Softcopy: base/16 (128 × 192), base/4 (256 × 384) and base (512 × 768); hardcopy: base (512 × 768), 4 base (1024 × 1536) and 16 base (2048 × 3072).

Zoom/crop amount - softcopy: 1X, 1.5X, 2X, 4X and 6X; hardcopy 4" × 6": 1X, 1.5X, 2X, 4X and 6X; hardcopy 8" × 12": 1X, 2X and 6X. Zoom/crop amounts were calculated from the original scanned image.

Image size - softcopy: constant at 4" × 6": (base/4 (256 × 384)) at 64 dpi; hardcopy 4" × 6" (16 base (2048 × 3072)); hardcopy 8" × 12" (64 base (4096 × 6144)) at 508 dpi.

Resampling method - Linear and cubic convolution ($\alpha$: = −0.5) were used to resample to final output size for both hardcopy and softcopy output devices. Both methods are described in R. G. Keys, "Cubic Convolution Interpolation for Digital Image Processing," IEEE Trans. on Acoustics, Speech, Signal Proc., ASSP-29, 1153, (1981).

The image presentations were blocked by scene, and scene order was counterbalanced with a Latin Square design. Image order within scene was randomized by zoom/crop amount, scan resolution, and interpolation methods. The dependent measures were ratio-scaled-image-quality rating and acceptability category.

Scenes

Four different scenes were used for this experiment: an outdoor winter people scene (Skipond), a couple on a parkbench (Parkbench), an indoor people scene (Hearth), an indoor couple scene (Couple). Among other characteristics, the scenes varied in illumination type and camera-to-distance. The Skipond, Parkbench, and Hearth scenes were captured onto 100 speed photographic film and scanned at a resolution of 16 Base (2048 × 3072) with the Kodak PCD 2000 scanner. The original images were captured under controlled lighting and camera conditions. MTF targets were measured for all of these scenes.

The Couple scene was captured onto 100 speed photographic film with a Kodak Cameo EX camera and scanned to Photo CD using a Kodak Professional PCD Imaging Workstation (PIW). This scene represents a "base case" consumer type image; Also, the Couple scene was included in the subjective results, but excluded from the objective results and the comparison of objective and subjective results.

In general, zoom and crop coordinates were chosen based on aesthetic appeal through adjusting the location of a fixed-size crop box.

Image Processing

Initially, the images were decimated to the correct starting scan resolution from a 16 Base (2048 × 3072) scan resolution through successive down by two decimations. A low-pass filter that achieved a pleasing level of sharpness was used to ensure that aliasing artifacts level of sharpness was used to ensure that aliasing artifacts were not evident in the images. All image types were zoomed and cropped at the specified coordinates and amounts and interpolated to the final display or output size. The interpolation methods were as specified above. The images were printed on a high resolution laser printer (508 dpi). The spatial frequency of the printer at a 0.50 response for the green channel was 3.40 cycles/mm in the slow direction (vertical) and 3.50 cycles/mm in the fast direction (horizontal).

Viewing Environment

The study was conducted in a darkened room and observers adapted to the ambient light level during a practice session. The prints were viewed in a light box under D50 lighting and were viewed at a constant distance of 16 inches. A headrest attached to the light box maintained this distance. The prints were placed in print stands attached to the bottom of the light box.

Procedure

For the images described above, overall image quality was rated on a ratio scale using fixed modulus magnitude estimation. The reference image modulus was assigned a value of 100 and each scene had its own reference image. The reference image was a 16 Base, 4" × 6", non-zoomed and cropped image. No resampling was required to print the reference images. Observers were especially encouraged to think of the reference image as a presentation of the original scene rather than merely an image. They practiced the technique with a set of images processed with all of the image manipulations. Throughout the study, observers were asked to continue to refer to the reference image when providing their ratings.

Finally, observers were asked to categorize the images as "Acceptable" or "Unacceptable." They provided acceptability categories without referring to the reference.

What is claimed is:

1. A method using empirically derived image quality data for determining an image resolution for a particular zoom and/or crop of an image, said method comprising the steps of:
   selecting a particular amount of zoom and/or crop;
   selecting an acceptability value, wherein the acceptability value relates to empirically derived image quality as perceived by a human viewer;
   selecting a particular output medium from a plurality of output media; and
   generating an image resolution from a combination of the selected zoom and/or crop, acceptability value and the particular output medium for specifying the image resolution to produce the desired zoom and/or crop.

2. The method as claimed in claim 1 wherein the selection of an output medium includes selection of either softcopy or hardcopy.

3. The method as claimed in claim 2 wherein the selection of a hardcopy output medium includes selection of a hardcopy size.

4. The method as claimed in claim 1 further including the step of utilizing the image resolution as the scan resolution for performing a scan of the image.

5. A method using empirically derived image quality data for determining the necessary scan resolution for specifying a particular zoom and/or crop of a digital image, said method comprising the steps of:
   selecting a particular amount of zoom and/or crop;
   selecting an acceptability value, wherein the acceptability value relates to empirically derived image quality as perceived by a human viewer;
   selecting a particular output medium from a plurality of output media; and
   generating a scan resolution from a combination of the selected zoom and/or crop, acceptability value and the particular output medium to determine the resolution of the digital image necessary to produce the desired zoom and/or crop.

6. The method as claimed in claim 5 wherein the selection of an output medium includes selection of either softcopy or hardcopy.

7. The method as claimed in claim 6 wherein the selection of a softcopy output medium includes selection of either softcopy preview or softcopy use.

8. The method as claimed in claim 6 wherein the selection of a hardcopy output medium includes selection of a hardcopy size.

9. The method as claimed in claim 8 wherein the selection of a hardcopy size includes selection of either 4"×6" and 8"×12" sizes.

10. The method as claimed in claim 5 further including the step of utilizing the scan resolution to perform a scan that produces the digital image.

11. A method for notifying a user of the necessary scan resolution to zoom and/or crop an image at an acceptable image quality, said method comprising the steps of:

provinding the image as a digital image having an initial scan resolution;

selecting a particular amount of zoom and crop;

viewing the zoomed and/or cropped image at the initial scan resolution;

generating a scan resolution by reference to an acceptability value, wherein the acceptability value relates an empirically derived image quality as perceived by a human viewer, and by relating the acceptability value to the selected zoom and/or crop and a preferred output medium to determine the resolution of the digital image necessary to produce the desired zoom and/or crop;

comparing the scan resolution to the initial scan resolution; and notifying the user if the scan resolution is different from the initial scan resolution.

12. The method as claimed in claim 11 wherein the preferred output medium includes selection of either softcopy or hardcopy.

13. The method as claimed in claim 12 wherein the selection of a softcopy output medium includes selection of either softcopy for purposes of preview preview or softcopy for purposes of image use.

14. The method as claimed in claim 11 wherein the selection of a hardcopy output medium includes selection of a hardcopy size.

15. A method for warning a user of inadequate scan resolution to zoom and/or crop an image at an acceptable image quality, said method comprising the steps of:

indicating a desire to perform a given zoom and/or crop operation on the image;

providing an acceptability value for the image, wherein the acceptability value relates to empirically derived image quality as perceived by a human viewer;

generating a minimally acceptable scan resolution for the given amount of zoom and/or crop that is desired by relating the acceptability value to the selected zoom and/or crop and a preferred output medium to determine the resolution of the digital image necessary to produce the desired zoom and/or crop; and warning the user if the desired zoom and/or crop will be provided at less than the minimally acceptable scan resolution.

16. The method as claimed in claim 15 wherein the preferred output medium includes selection of either softcopy or hardcopy.

17. The method as claimed in claim 16 wherein the selection of a softcopy output medium includes selection of either softcopy for purposes of preview preview or softcopy for purposes of image use.

18. The method as claimed in claim 15 wherein the selection of a hardcopy output medium includes selection of a hardcopy size.

19. A method for determining the minimally acceptable scan resolution of an image that is selected for a particular zoom and/or crop operation on an output device, said method comprising the steps of:

generating an acutance value for the image from the modulation transfer function of an input device and the output device, the viewing distance, the magnification amount and the human contrast sensitivity function;

relating the acutance value to a mean relative image quality rating;

comparing the mean relative image quality rating to a range of acceptability values, wherein the acceptability values relate to empirically derived image quality as perceived by a human viewer; and selecting an acceptability value corresponding to the mean relative image quality rating;

relating the acceptability value to a minimally acceptable scan resolution for the particular zoom and/or crop operation.

20. The method as claimed in claim 19 further comprising the step of using the acceptability value as an acceptability threshold.

21. The method as claimed in claim 20 further comprising the step of generating a warning signal when a proposed zoom and/or crop operation will produce an acceptability value less than the acceptability threshold.

22. A method for determining the acceptability of an image that is selected for a particular zoom and/or crop imaging operation, said method comprising the steps of:

relating the particular imaging operation to an objective metric related to sharpness;

relating the objective metric to a subjective acceptability metric that is based upon evaluation of particular images modified by application of the particular imaging operation; and comparing the acceptability metric to an acceptability threshold to determine the acceptability of an image that is selected for the particular imaging operation.

23. The method as claimed in claim 22 wherein the objective metric and the subjective acceptability metric are both functions of a mean relative image quality rating.

24. A computer program product for using empirically derived image quality data for determining an image resolution for a particular zoom and/or crop of an image, said computer program comprising: a computer readable storage medium having a computer program stored thereon for performing the steps of:

selecting a particular amount of zoom and/or crop;

selecting an acceptability value, wherein the acceptability value relates to empirically derived image quality as perceived by a human viewer;

selecting a particular output medium from a plurality of output media; and generating an image resolution from a combination of the selected zoom and/or crop, acceptability value and the particular output medium for specifying the image resolution to produce the desired zoom and/or crop.

25. The computer program product as claimed in claim 24 wherein the selection of an output medium includes selection of either softcopy or hardcopy.

26. The computer program product as claimed in claim 25 wherein the selection of a hardcopy output medium includes selection of a hardcopy size.

27. The computer program product as claimed in claim 24 further including the step of utilizing the image resolution as the scan resolution for performing a scan of the image.

28. A computer program product for determining the minimally acceptable scan resolution of an image that is selected for a particular zoom and/or crop operation on an output device, said computer program product comprising:

a computer readable storage medium having a computer program stored thereon for performing the steps of:

generating an acutance value for the image from the modulation transfer function of an input device and the output device, the viewing distance, the magnification amount and the human contrast sensitivity function;

relating the acutance value to a mean relative image quality rating;

comparing the mean relative image quality rating to a range of acceptability values, wherein the acceptability values relate to empirically derived image quality as perceived by a human viewer; and selecting an acceptability value corresponding to the mean relative image quality rating;

relating the acceptability value to a minimally acceptable scan resolution for the particular zoom and/or crop operation.

29. The computer program product as claimed in claim 28 further comprising the step of using the acceptability value as an acceptability threshold.

30. The computer program product as claimed in claim 29 further comprising the step of generating a warning signal when a proposed zoom and/or crop operation will produce an acceptability value less than the acceptability threshold.

* * * * *